United States Patent
Bolt et al.

(10) Patent No.: US 9,442,859 B1
(45) Date of Patent: Sep. 13, 2016

(54) METHOD FOR ASYNCHRONOUS POPULATION OF DATA CACHES USED WITH MASS STORAGE DEVICES

(71) Applicant: Samsung Electronics Co., Ltd., Suwon-si, Gyeonggi-do (KR)

(72) Inventors: Thomas R. Bolt, San Diego, CA (US); Clay Mayers, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 661 days.

(21) Appl. No.: 13/775,164

(22) Filed: Feb. 23, 2013

Related U.S. Application Data

(60) Provisional application No. 61/660,801, filed on Jun. 17, 2012.

(51) Int. Cl.
- *G06F 12/00* (2006.01)
- *G06F 12/08* (2016.01)

(52) U.S. Cl.
CPC ....... *G06F 12/0866* (2013.01); *G06F 12/0862* (2013.01); *G06F 12/0893* (2013.01)

(58) Field of Classification Search
CPC .................. G06F 11/2074; G06F 12/0868
See application file for complete search history.

(56) References Cited

U.S. PATENT DOCUMENTS

| | | | |
|---|---|---|---|
| 5,481,691 A | 1/1996 | Day, III et al. | |
| 5,673,394 A | 9/1997 | Fenwick et al. | |
| 5,765,181 A | 6/1998 | Oberlin et al. | |
| 5,983,324 A | 11/1999 | Ukai et al. | |
| 5,996,088 A | 11/1999 | Frank et al. | |
| 6,000,006 A | 12/1999 | Bruce et al. | |
| 6,567,904 B1 | 5/2003 | Khandekar et al. | |
| 6,760,815 B1 | 7/2004 | Traversat et al. | |
| 6,941,425 B2 | 9/2005 | Osborne | |
| 7,047,387 B2 | 5/2006 | Goodsell | |
| 7,117,306 B2 * | 10/2006 | Rudelic | 711/118 |
| 7,356,651 B2 | 4/2008 | Liu et al. | |
| 7,406,473 B1 | 7/2008 | Brassow et al. | |
| 7,428,636 B1 | 9/2008 | Waldspurger et al. | |
| 7,469,321 B2 | 12/2008 | Heller, Jr. | |
| 7,484,073 B2 | 1/2009 | Cohen et al. | |
| 7,509,460 B2 | 3/2009 | Zeffer et al. | |
| 7,512,769 B1 | 3/2009 | Lowell et al. | |
| 7,543,109 B1 | 6/2009 | Bell, Jr. et al. | |
| 7,620,784 B2 | 11/2009 | Panabaker | |
| 7,657,701 B2 | 2/2010 | Shanmuganathan | |
| 7,657,706 B2 | 2/2010 | Iyer et al. | |
| 7,660,953 B2 | 2/2010 | Ohran | |

(Continued)

OTHER PUBLICATIONS

Peter Desnoyers, "Analytic Modeling of SSD Write Performance", SYSTOR '12 Proceedings of the 5th Annual International Systems and Storage Conference, Jun. 2012, Article No. 12; ACM.

(Continued)

*Primary Examiner* — Reginald Bragdon
*Assistant Examiner* — Hannah A Faye-Joyner
(74) *Attorney, Agent, or Firm* — Renaissance IP Law Group LLP

(57) ABSTRACT

A method and system for transferring data from mass storage devices to the high speed data cache in a manner that imposes minimal overhead to the normal input/output mechanism and minimizes the load placed on the device being cached is disclosed herein. Minimizing the load placed on the slower device and minimizing the overhead of processing input/output requests results in optimal performance.

10 Claims, 5 Drawing Sheets

(56) References Cited

U.S. PATENT DOCUMENTS

| | | |
|---|---|---|
| 7,702,857 B2 | 4/2010 | Gill et al. |
| 7,734,820 B1 | 6/2010 | Ranade et al. |
| 7,783,839 B2 | 8/2010 | Gill et al. |
| 7,814,276 B2 | 10/2010 | Lin et al. |
| 7,853,960 B1 | 12/2010 | Agesen et al. |
| 7,856,530 B1 | 12/2010 | Mu |
| 7,890,754 B2 | 2/2011 | Waldspurger et al. |
| 7,945,761 B2 | 5/2011 | Subrahmanyam et al. |
| 7,954,150 B2 | 5/2011 | Croft et al. |
| 7,975,109 B2 | 7/2011 | Mcwilliams et al. |
| 8,386,749 B2 | 2/2013 | Dannowski et al. |
| 2005/0125513 A1 | 6/2005 | Sin-Ling Lam et al. |
| 2005/0232192 A1 | 10/2005 | Rawson, III |
| 2008/0005529 A1 | 1/2008 | Morris |
| 2009/0216910 A1 | 8/2009 | Duchesneau |
| 2010/0191929 A1 | 7/2010 | Rawson, III |
| 2010/0299667 A1 | 11/2010 | Ahmad et al. |
| 2010/0332786 A1 | 12/2010 | Grohoski et al. |
| 2011/0010502 A1 | 1/2011 | Wang et al. |
| 2011/0069725 A1 | 3/2011 | Shkunov et al. |
| 2011/0119669 A1 | 5/2011 | McRae |
| 2011/0208900 A1 | 8/2011 | Schuette et al. |
| 2012/0017049 A1 | 1/2012 | Hass |
| 2012/0023077 A1 | 1/2012 | Kann et al. |
| 2012/0054445 A1 | 3/2012 | Swart et al. |
| 2012/0054447 A1 | 3/2012 | Swart et al. |
| 2012/0066483 A1 | 3/2012 | Boury et al. |
| 2012/0072576 A1 | 3/2012 | Yumerefendi et al. |
| 2012/0072691 A1 | 3/2012 | Kawamura |
| 2012/0079072 A1 | 3/2012 | Serenyi et al. |
| 2012/0096473 A1 | 4/2012 | Durham et al. |
| 2012/0124294 A1 | 5/2012 | Atkisson et al. |
| 2012/0303869 A1* | 11/2012 | Benhase et al. ............ 711/103 |
| 2013/0013877 A1 | 1/2013 | Tian |

OTHER PUBLICATIONS

Ismail Ari et al, "ACME: Adaptive Caching Using Multiple Experts", Proceedings of the 2002 Workshop on Distributed Data and Structures (WDAS 2002). Mar. 2002.

* cited by examiner

METHOD FOR ASYNCHRONOUS POPULATION OF DATA CACHES USED WITH MASS STORAGE DEVICES

CROSS REFERENCE TO RELATED APPLICATION

The present application claims priority to U.S. Provisional Patent Application No. 61/660,801, filed on Jun. 17, 2012, which is herby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to cache resources for computer systems.

2. Description of the Related Art

Caches must be populated with data before they can begin to offload data accesses from slower devices. This involves copying data from the slower device being cached into the higher speed cache device. Typically this involves a read operation from the slower device followed by a write to the cache device. Since the main intent of high speed caching devices is to offload the slower mass storage devices, most caching algorithms attempt to minimize I/O requests to the slower mass storage devices.

Traditional caches copy the data to the cache device during the processing of an input/output request to the slower device. This approach may be termed "opportunistic/synchronous" population, since it takes advantage of the opportunity afforded by the existing input/output request to copy the data without having to perform an additional read request to the device being cached. Unfortunately this "opportunistic" approach introduces extra processing on the input/output request since the data cannot be released to the origin of the input/output request until the copy has been completed, in effect synchronizing the act of copying the data for the purposes of populating the cache and the processing of an input/output request. Furthermore this type of "opportunistic" cache population can be complicated by performance optimizations that coalesce non-adjacent input/output requests by creating scatter/gather lists that discard portions of the data represented by the input/output request. In environments that perform this type of optimization the "opportunistic/synchronous" cache population algorithms must inspect the memory buffers associated with all outstanding input/output requests to ensure there are no overlapping regions that could corrupt the data being copied to populate the cache.

General definitions for terms utilized in the pertinent art are set forth below.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

"Cache" refers to the memory in which data is stored in order to make the data more readily and speedily accessible, transparently. When a cache is exhausted, it is flushed of data, to be replaced with the next cache according to a replacement algorithm.

"Cached data" is data in cache memory duplicating original values stored elsewhere (such as the hard disk) on a computer.

"Cache hit" refers to when the processor looks for data in cache memory and finds the data. A cache hit places less strain on input/output (I/O) resources and limited network resources.

"Cache miss" refers to when the processor looks for data in cache memory and finds that it is not there, resulting in having to read from the main memory or hard disk. Data retrieved during a cache miss is often written into the cache in anticipation of further need for it.

"Caching resources" refers to the physical or virtual components of limited availability required for caches or the process of caching, such as memory or a processing unit.

"Cloud computing" is generally defined as using computing resources, primarily servers, owned by a third party provider (such as the AMAZON ELASTIC COMPUTE CLOUD, JOYENT, and GOOGLE APPS) such that the user does not need to make a substantial investment in computer hardware and scale resources depending on the user's needs. Cloud computing primarily involves Web applications but can include storage, raw computing and other specialized services.

Compatibility library is a software program that provides an interface between computer programs, and in particular an interface that provides an interface between a proprietary environment and an open source or GNU GPL device driver that provides the supporting functionality for the device driver.

"Data center" is a centralized location where computing resources (such as, host computers, servers, applications, databases, or network access) critical to an organization are maintained in a highly controlled physical environment.

Device driver is a software program that allows a hardware device to interact with software installed on the hardware device.

"Execution environments" refers to operating systems or virtual machines in which executable programs are executed. When a computer program is executed, or running, a process is created.

Function pointer is a programming language data type that invokes a function in a computer memory.

GNU, General Public License is a license for an open source operating system based on UNIX, which requires that derived works be distributed under the same license terms.

Hypervisor is a hardware virtualization technique that allows a computer to host multiple operating systems by providing a guest operating system with a virtual operating platform.

Kernel is a component of an operating system that connects a computer's software applications to the computer's hardware.

"Load balancing" refers to distributing workload across multiple computers, central processing units, or other resources, to achieve optimal resource utilization, maximize throughput, minimize response time, and avoid overload.

"Logical unit number" or "LUN" is an identification number given to logical units (devices) connected to a SCSI "Small Computer System Interface" adapter; typically, the logical disks in a storage area network (SAN).

"Mass storage devices" refers to removable or non-removable media that can store large amounts of data, such as tape drives, redundant array of independent disks (RAID), magnetic disks, or flash drives.

"Non-volatile caching device" refers to a storage device that can retain data within memory even when the device is not powered on, such as a flash drive.

"Open source software" or "OSS" refers to computer software that is available with open access to the source code (design and implementation), which is typically free.

"Process identifier", "process ID", or "PID" is a number used by operating systems (OS) to uniquely identify a process, an OS object that consists of an executable program, a set of virtual memory addresses, and one or more threads. When a program runs, a process is created.

Semaphore is an abstract data type that provides an abstraction for controlling access to a common resource in a parallel programming environment by multiple processes.

"Virtualization" refers to a computer software/hardware platform that allows running several operating systems simultaneously on the same computer. VMware vSphere Hypervisor™ (ESXi) is an example of a hardware virtualization product.

"Virtualized environment" refers to hypervisor, or virtualization, systems.

Virtual Machine is a software abstraction of a physical computer.

"Web-Browser" is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

"Web-Server" is a computer able to simultaneously manage many Internet information-exchange processes at the same time. Normally, server computers are more powerful than client computers, and are administratively and/or geographically centralized. An interactive-form information-collection process generally is controlled from a server computer.

Data within computing environments may be cached to high speed devices to improve performance. The majority of data is stored on mass storage devices (i.e. disk drives and disk arrays) and transferred to caches devices on an as needed basis. The placement of data within the high speed device is referred to as population of the cache and requires the transfer of data from the slower device being cached to the high speed device. The transfer of data to the high speed devices may create extra load on the slower device being cached and/or add overhead (extra work or delays not directly related to satisfying the input/output request) to the fetching of data.

BRIEF SUMMARY OF THE INVENTION

The present invention discloses a method for transferring data from mass storage devices to the high speed data cache in a manner that imposes minimal overhead to the normal input/output mechanism and minimizes the load placed on the device being cached. Minimizing the load placed on the slower device and minimizing the overhead of processing input/output requests results in optimal performance.

The purpose of this invention is to populate a high speed cache device as efficiently as possible with respect to impact on the slower device being cached and normal input/ouput processing.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention populates a cache device in an asynchronous manner and counter-intuitively issues more input/output requests to a slower device in a manner that actually improves efficiency. Since the cache device population mechanism is asynchronous, the cache device population mechanism imposes minimal additional processing overhead on normal input/output requests (e.g. the cache device population mechanism does not have to delay processing while the cache device population mechanism copies the data nor does the cache device population mechanism have to inspect the destination memory buffers). Although the method for populating a high speed cache device in an efficient manner is asynchronous, the key to efficiency is a direct correlation of the asynchronous cache population with the normal input/output processing.

Figure 1:
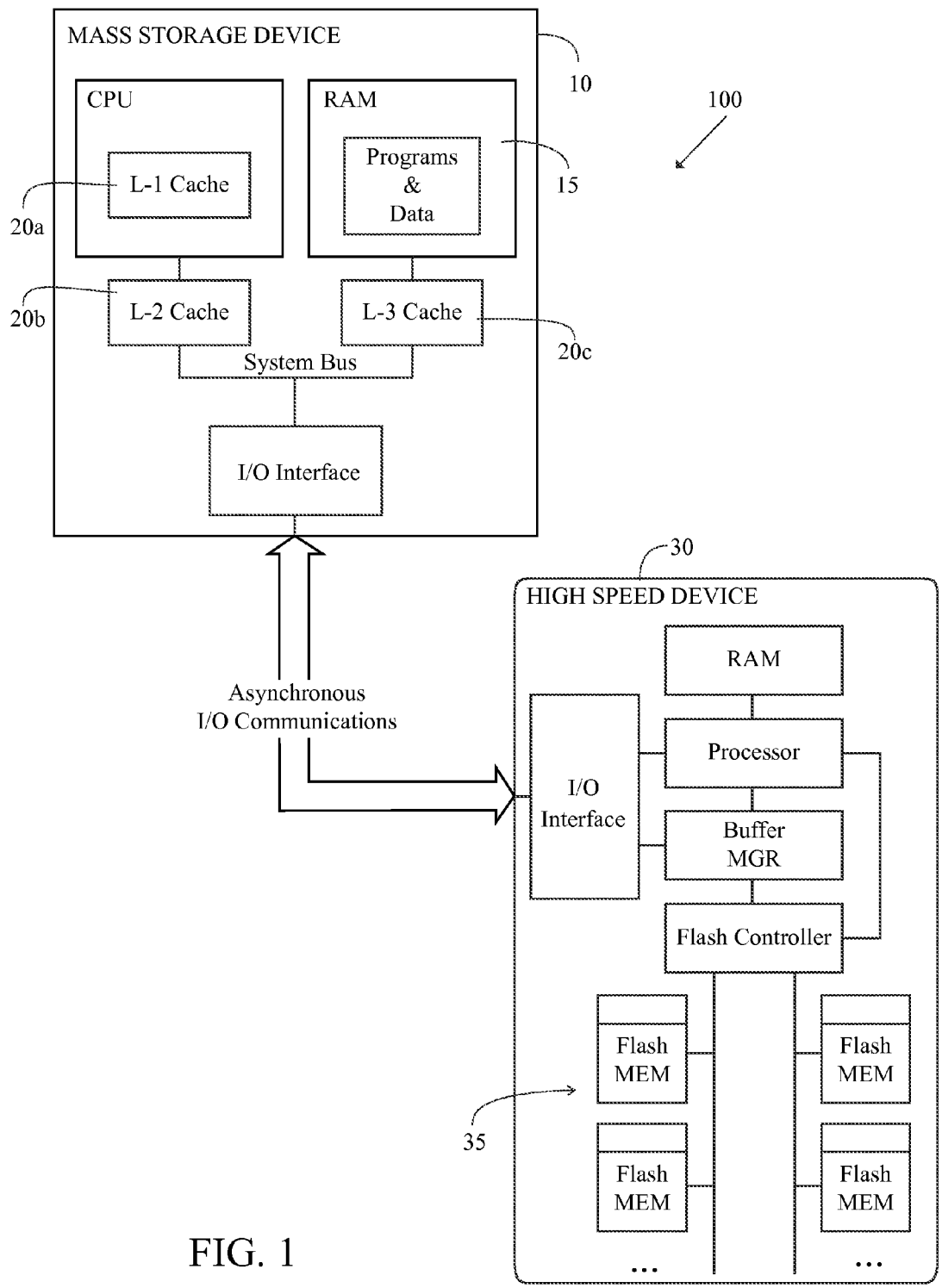
FIG. 1 is a block diagram of a system for populating a high speed cache device in an efficient manner.

Modern mass storage devices are electro-mechanical in nature and orders of magnitude slower in access time than solid state devices such as memory or flash based caches. FIG. 1 illustrates a system 100 for populating a high speed cache device in an efficient manner. The system 100 preferably comprises a mass storage device 10 and a high speed device 30.

The mass storage device 10 preferably comprises a memory 15, a central processing unit, a system bus, an input/output interface and caches 20a, 20b and 20c. The high speed cache device 30 preferably comprises an input/output interface, a memory, a processor, a buffer manager, a flash controller and multiple flash memory modules 35.

Figure 2:
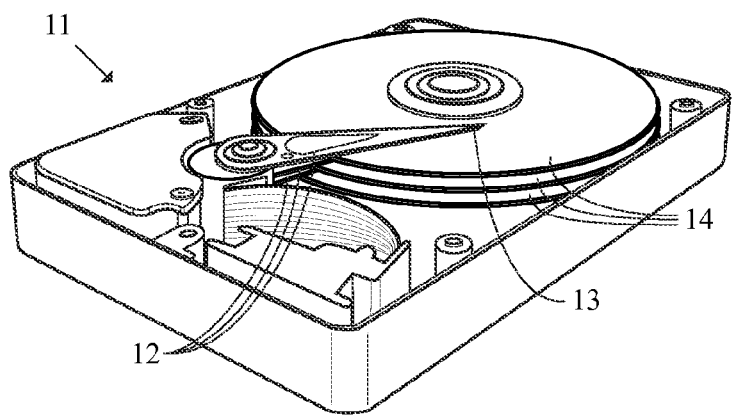
FIG. 2 is an image of a mechanical hard disk drive.

In order to maximize performance, the mass storage device 10 contains internal caches 20a-20c. The major performance limitations of the mass storage device 10 are related to the hard drives 11 of the mass storage device 10, as shown in FIG. 2. The movement of the actuator arms 12 of the hard drive 11 and the physical positioning of the read/write heads 13 (seeking) as well as rotational delays of the spinning disks 14. Due to the large delays incurred positioning the heads 13 and waiting for the correct disk 14 location to spin under the read/write heads 13, most mass storage systems read entire tracks of data off a disk 14 into their internal caches in the hopes of being able to satisfy subsequent read accesses without having to position the heads 13 or wait for rotational delays.

Figure 3:
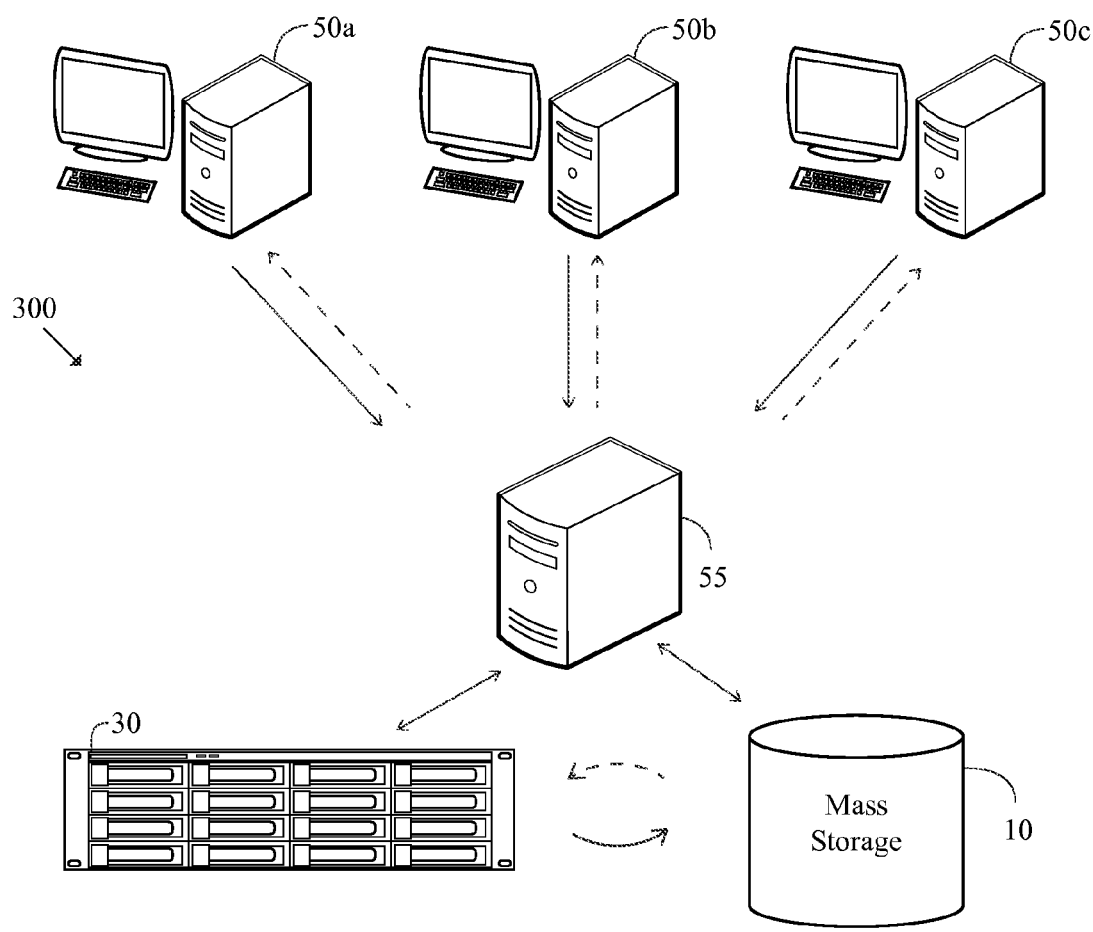
FIG. 3 is a block diagram of a system for populating a high speed cache device in an efficient manner.

FIG. 3 shows an example system 300 of a networked environment where client devices (desktop computers) 50a-50c are requesting data from a server 55 and the server 55 is fetching the data from the mass storage device 10. The high speed device 30 issues a read request at the same time since the internal cache of the mass storage device 10 will either already have the data, a cache hit, or it will write the requested data after a cache miss.

If data is contained within the internal cache 20a-20c of a mass storage device 10, the impact of satisfying a read request is minimal and limited mainly to the bandwidth consumed by transferring the data from the mass storage device 10. Read access to data within the internal cache 20a-20c does not involve the most constrained resource of the mass storage device 10, the read/write heads 13 and the associated positioning mechanisms 12.

Figure 4:
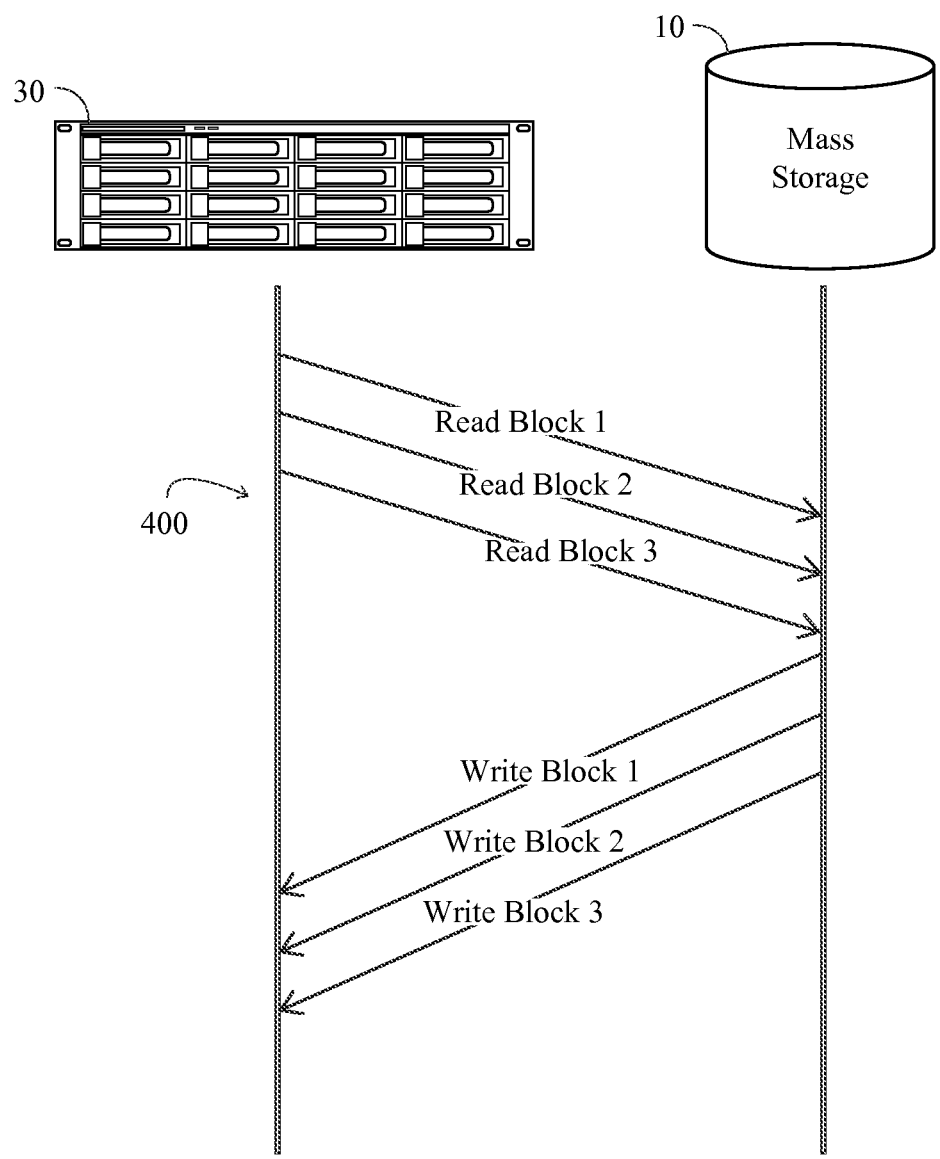
FIG. 4 is a block diagram of a system of an asynchronous process.

As shown in FIG. 4, the mechanism for populating the high speed cache 30 involves issuing asynchronous read requests 400 to the mass storage device 10 when there is a high probability that the requested data is present within the internal cache 20 of the mass storage device 10. When the requested data is already in the internal cache 20 of the mass storage device 10, the impact of the additional asynchronous read request is minimized since the asynchronous read request does not require the resources of the read/write heads. Furthermore, since the internal caches 20 of the mass storage device 10 typically cache entire disk tracks and perform read-ahead caching of logically adjacent disk locations, the asynchronous read request used to populate the high speed cache device 30 is of a size that is optimized for the high speed cache device 30 regardless of the size of the input/output request that triggered the population of the data in the high speed cache device 30.

Figure 5:
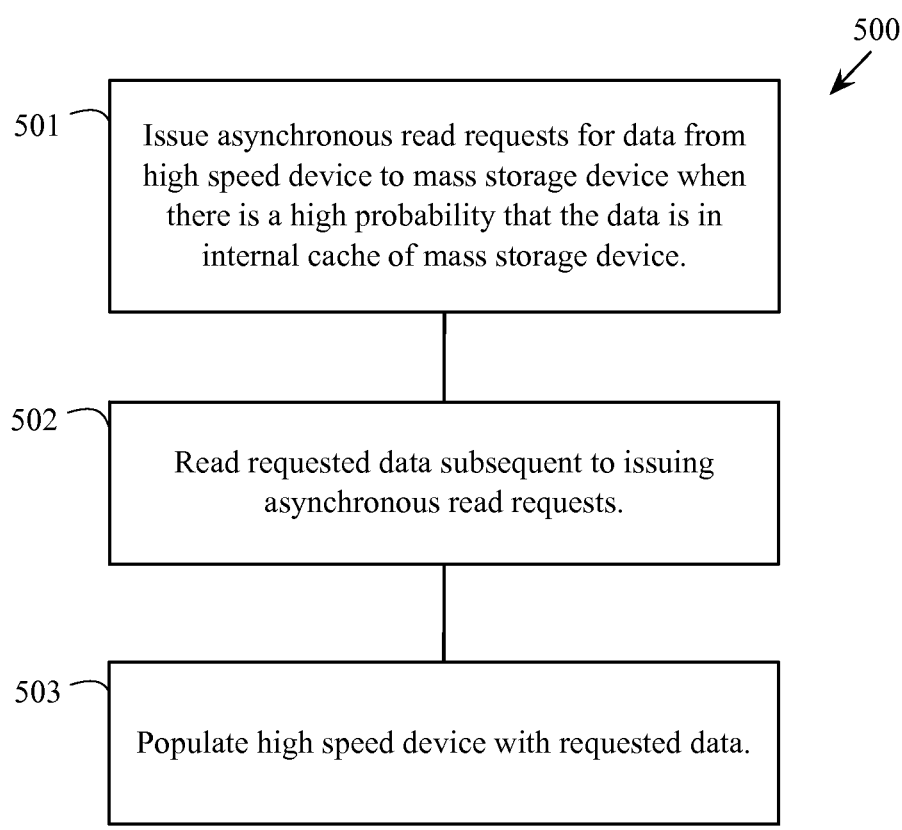
FIG. 5 is a flow chart for a method for populating a high speed cache device in an efficient manner.

FIG. 5 is a flow chart of the method 500 of the present invention. A computer application issues a read request for data that would be beneficial to load into a cache. This action creates a situation where there is a high probability that the data will be loaded into the internal cache 20 of the slow mass storage device 10. At block 501, as soon as possible (since the probability of the data remaining in the internal cache 20 of the mass storage device 10 decreases over time), asynchronous read requests are issued from the flash-based high speed device 30 to the slower mass storage device 10 when there is a high probability that the data is in the internal cache 20 of the mass storage device 10. The requested data is read immediately, subsequent to issuing the asynchronous read requests at block 502. Then, at block 503, the high speed device 30 is populated with the requested data.

The preferred implementation involves the signaling of an event from the main processing of the input/output read request for data that is desired to be populated in the high speed caching device 30 to an asynchronous process responsible for populating the high speed cache device 30. The signaling of this event contains the logical address of the data desired to be populated and imposes minimal impact to the main processing of the read request. Preferably, this event is queued to the asynchronous process in a "last-in-first-out" (LIFO) manner.

The asynchronous process, upon receipt of an event, reads the requested data as soon as possible. Reading the data as soon as possible after the read that triggered the cache population event maximizes the probability that the requested data is within the internal cache 20 of the mass storage device 10. The size of the read request to populate the high speed cache device 30 is optimized for the high speed cache device 30, taking advantage of whole track reads and read ahead in the internal cache of the slower mass storage device 10.

The use of a LIFO queue to process the asynchronous cache population process allows the asynchronous process to maximize the probability that the data requested is in the internal cache 20 of the mass storage device 10. If the asynchronous process times the read requests, the asynchronous process can determine when it is not able to keep up with the eviction of stale data within the internal caches 20 of the slower mass storage device 10. If the asynchronous processing detects that read requests are not being processed from the internal caches 20 by the amount of time necessary to satisfy the read requests, the asynchronous process purges older events from the queue. Doing so causes these cache population events to be "lost."

Lost cache population events result in a slower population of the high speed cache device 30, however lost cache population events avoid cache population reads from presenting extra load on the constrained resources of the read/write heads 13 in the mass storage device 10.

The mechanism for populating a high speed cache device in an efficient manner is alternatively implemented without the use of a LIFO queuing mechanism. Doing so decreases the likelihood of satisfying the asynchronous cache population read requests. Although events are listed as the signaling method between the main processing of input/output requests and the asynchronous cache population process, other mechanisms such as a combination of queues, messages, or other data structures and semaphores, interrupts or other notifications may be used. The use of the term "process" is generic and may refer to any scheduling mechanism such as an actual process or threading implementation.

The present invention minimizes processing delays of normal input output requests. The mechanism for populating a high speed cache device in an efficient manner preferably does not require delays to copy data buffers during normal input/output processing and does not need to verify the integrity of data read during normal input/output processing prior to populating the high speed cache device. The mechanism for populating a high speed cache device in an efficient manner requires only a notification of the asynchronous population process when desired data is highly likely to be present in the internal cache of the mass storage device.

The present invention preferably reduces demands on the most highly limited resources of the mass storage device 10. By maximizing the probability the read request used to populate the high speed cache device 30 will be present in the internal cache 20 of the mass storage device 10, the mechanism reduces load on the read write heads 13, associated positioning mechanism, as well as minimizing rotational latencies.

The present invention allows the cache to be populated in increments other than the size of an opportunistic input/output request. The mechanism for populating a high speed cache device in an efficient manner can take advantage of whole track caching and read ahead caching in the mass storage device 10 to efficiently populate the high speed cache device 30 regardless of the size of normal input/output requests.

Figure 6:
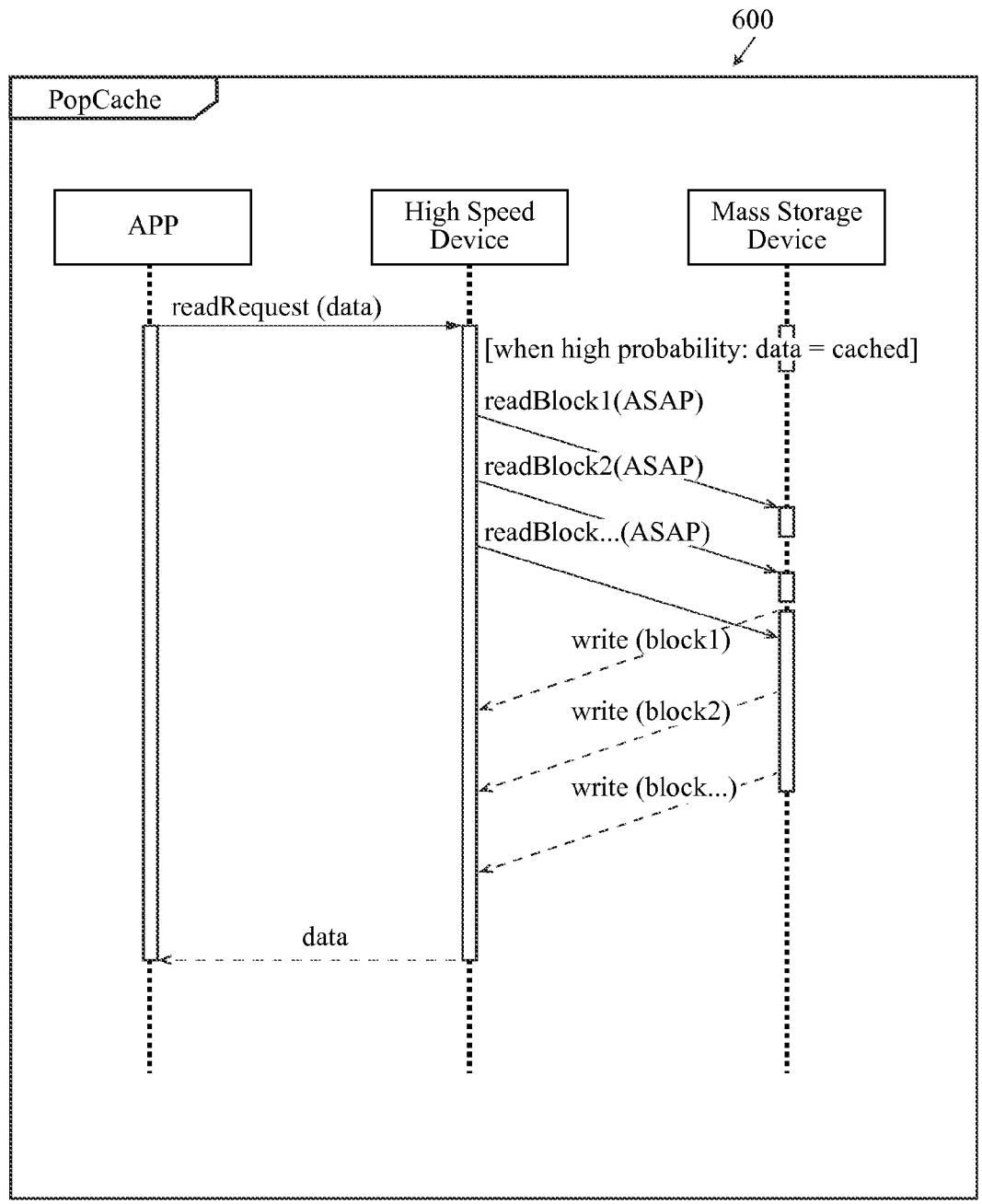
FIG. 6 is a sequence diagram for populating a high speed cache device in an efficient manner.

FIG. 6 illustrates a sequence diagram for populating a high speed cache device in an efficient manner. A computer application (APP) issues a read request for data that would be beneficial to load into a cache. This action creates a situation where there is a high probability that the data will be loaded into the internal cache 20 of the slow mass storage device 10. As soon as possible (since the probability of the data remaining in the internal cache 20 of the mass storage device 10 decreases over time), asynchronous read requests are issued from the flash-based high speed device 30 to the slower mass storage device 10 when there is a high probability that the data is in the internal cache 20 of the mass storage device 10. The requested data is read immediately, subsequent to issuing the asynchronous read requests. Then, the requested data is written to the high speed device.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for populating a high speed cache device in an efficient manner, the method comprising:
   issuing, by a computer server, a read request for requesting data;
   issuing, by a high speed cache device that is separate from the computer server, a plurality of asynchronous read requests for at least the requested data to a mass storage device that is separate from the high speed cache device contemporaneously with the computer server issuing the read request when there is a high probability that the requested data is present within an internal cache of the mass storage device;
   reading the requested data immediately subsequent to the issuing of the plurality of asynchronous read requests; and
   populating the high speed cache device with at least the requested data.

2. The method according to claim 1 wherein the mass storage device comprises a plurality of read/write heads and a plurality of spinning disks.

3. The method according to claim 1 wherein the high speed cache device comprises a plurality of flash modules.

4. The method according to claim 1 further comprising: determining that the plurality of asynchronous read requests are not being processed from the internal cache of the mass storage device in an amount of time necessary to satisfy the plurality of asynchronous read requests; and purging a plurality of older cache population events from a queue responsive to determining that the plurality of asynchronous read requests are not being processed from the internal cache of the mass storage device in the amount of time necessary to satisfy the plurality of asynchronous read requests.

5. The method according to claim 1 wherein issuing the plurality of asynchronous read requests for the requested data further comprises:
   issuing a first asynchronous read request for a first portion of the requested data to the mass storage device from the high speed cache device; and
   prior to populating the high speed cache device with the first portion of the requested data, issuing a second asynchronous read request for a second portion of the requested data to the mass storage device from the high speed cache device.

6. A system for populating a high speed cache device in an efficient manner, the system comprising:
   a computer server configured to issue a read request for requested data;
   a mass storage device separate from the computer server, and comprising an internal cache having the requested data;
   a high speed cache device separate from the mass storage device and separate from the computer server, the high speed cache device configured to issue a plurality of asynchronous read requests for at least the requested data to the mass storage device at the same time as the computer server issues the read request when there is a high probability that the requested data is present within the internal cache of the mass storage device;
   wherein the high speed cache device is populated with at least the requested data.

7. The system according to claim 6 wherein the high speed cache device comprises a plurality of flash modules.

8. The system according to claim 6 wherein:
   the computer server is configured to issue the read request for the requested data in a last-in-first-out manner;
   the high speed cache device is configured to issue the plurality of asynchronous read requests from the high speed cache device to the mass storage device for the requested data as soon as possible responsive to receiving the read request; and
   a size of the asynchronous read requests takes advantage of whole track reads and read ahead in the internal cache of the mass storage device.

9. The system according to claim 6 wherein the mass storage device comprises a plurality of read/write heads and a plurality of spinning disks.

10. The system according to claim 6, wherein:
    the high speed cache device is configured to issue a first asynchronous read request for a first portion of the requested data to the mass storage device; and
    prior to the high speed cache device being populated with the first portion of the requested data, the high speed cache device is configured to issue a second asynchronous read request for a second portion of the requested data to the mass storage device.

* * * * *